(12) United States Patent
Cox et al.

(10) Patent No.: US 7,844,518 B1
(45) Date of Patent: Nov. 30, 2010

(54) METHOD AND APPARATUS FOR MANAGING CREDIT LIMITS

(75) Inventors: Andrew Cox, London (GB); Donna Dellosso, New York, NY (US); Mark Cisz, Northport, NY (US); Ela Bekker, Staten Island, NY (US); Jean-Christopher Chandumont, New York, NY (US); Joseph Dafni, Hasting-on-Hudson, NY (US)

(73) Assignee: JP Morgan Chase Bank, New York, NY (US)

( * ) Notice: Subject to any disclaimer, the term of this patent is extended or adjusted under 35 U.S.C. 154(b) by 939 days.

(21) Appl. No.: 11/108,987

(22) Filed: Apr. 19, 2005

Related U.S. Application Data

(60) Provisional application No. 60/631,813, filed on Nov. 30, 2004.

(51) Int. Cl.
*G06Q 40/00* (2006.01)
(52) U.S. Cl. ....................................................... 705/35
(58) Field of Classification Search .................... 705/35
See application file for complete search history.

(56) References Cited

U.S. PATENT DOCUMENTS

| | | | |
|---|---|---|---|
| 3,316,395 A | 4/1967 | Lavin | |
| 3,634,669 A | 1/1972 | Wyckoff et al. | |
| 3,718,764 A | 2/1973 | Deschenes et al. | |
| 4,594,663 A | 6/1986 | Hirayama | |
| 4,598,367 A | 7/1986 | DeFrancesco et al. | |
| 4,642,768 A | 2/1987 | Roberts | |
| 4,736,294 A | 4/1988 | Le Grand | |
| 4,739,478 A | 4/1988 | Roberts et al. | |
| 4,760,604 A | 7/1988 | Cooper | |
| 4,812,628 A | 3/1989 | Boston | |
| 4,831,526 A | 5/1989 | Luchs | |
| 4,866,634 A | 9/1989 | Reboh | |
| 4,897,811 A | 1/1990 | Scofield | |

(Continued)

FOREIGN PATENT DOCUMENTS

WO 9622576 7/1996

(Continued)

OTHER PUBLICATIONS

Car Loans in Minutes, Bank Management, vol. 64, No. 4, Apr. 1, 1993.

(Continued)

*Primary Examiner*—Kirsten S Apple
*Assistant Examiner*—Scott S Trotter
(74) *Attorney, Agent, or Firm*—Lowenstein Sandler PC

(57) ABSTRACT

A system and method for evaluating financial transactions, which may involve credit requests, is provided. Credit requests are categorized into three tiers: the third-tier is for requests capable of being processed by computers, the second-tier is for requests that meet predefined criteria and cannot be categorized as third-tier requests, and the first-tier is for requests that cannot be categorized as second-tier or third-tier requests. The first-tier requests are manually reviewed by a credit executive. The second-tier requests are delegated to more junior credit personnel via an inventive pre-approval procedure. The third-tier requests are processed, at least in part, by computers. Additionally, requests that exceed a credit line, or limit, may be approved by reallocating credit from other credit lines.

8 Claims, 6 Drawing Sheets

U.S. PATENT DOCUMENTS

| | | |
|---|---|---|
| 4,914,587 A | 4/1990 | Clouse |
| 4,964,043 A | 10/1990 | Galvin |
| 5,054,096 A | 10/1991 | Beizer |
| 5,206,803 A | 4/1993 | Vitagliano |
| 5,220,500 A | 6/1993 | Baird |
| 5,227,874 A | 7/1993 | Von Kohorn |
| 5,231,571 A | 7/1993 | D'Agostino |
| 5,233,547 A | 8/1993 | Kapp et al. |
| 5,239,462 A | 8/1993 | Jones |
| 5,262,941 A | 11/1993 | Saladin |
| 5,274,547 A | 12/1993 | Zoffel |
| 5,278,751 A | 1/1994 | Adiano |
| 5,305,434 A * | 4/1994 | Ballard et al. ............... 715/854 |
| 5,321,841 A | 6/1994 | East |
| 5,424,938 A | 6/1995 | Wagner |
| 5,444,844 A | 8/1995 | Inoue |
| 5,481,647 A | 1/1996 | Brody |
| 5,523,942 A | 6/1996 | Tyler |
| 5,537,315 A | 7/1996 | Mitcham |
| 5,550,734 A | 8/1996 | Tater |
| 5,551,021 A | 8/1996 | Harada |
| 5,606,496 A | 2/1997 | D'Agostino |
| 5,611,052 A | 3/1997 | Dykstra |
| 5,644,493 A | 7/1997 | Motai |
| 5,649,116 A * | 7/1997 | McCoy et al. ................. 705/38 |
| 5,655,085 A | 8/1997 | Ryan |
| 5,664,115 A | 9/1997 | Fraser |
| 5,689,649 A | 11/1997 | Altman et al. |
| 5,696,907 A | 12/1997 | Tom |
| 5,699,527 A | 12/1997 | Davidson |
| 5,701,400 A | 12/1997 | Amado |
| 5,715,402 A | 2/1998 | Popolo |
| 5,717,865 A | 2/1998 | Stratmann |
| 5,732,397 A | 3/1998 | DeTore |
| 5,742,775 A | 4/1998 | King |
| 5,758,328 A | 5/1998 | Giovannoli |
| 5,765,144 A | 6/1998 | Larche |
| 5,774,882 A | 6/1998 | Keen |
| 5,774,883 A | 6/1998 | Andersen et al. |
| 5,794,207 A | 8/1998 | Walker |
| 5,797,133 A | 8/1998 | Jones |
| 5,802,502 A | 9/1998 | Gell |
| 5,809,478 A | 9/1998 | Greco |
| 5,815,683 A | 9/1998 | Vogler |
| 5,832,447 A | 11/1998 | Rieker |
| 5,838,906 A | 11/1998 | Doyle |
| 5,842,178 A | 11/1998 | Giovannoli |
| 5,844,553 A | 12/1998 | Hao |
| 5,845,256 A | 12/1998 | Pescitelli |
| 5,848,427 A | 12/1998 | Hyodo |
| 5,862,223 A | 1/1999 | Walker |
| 5,870,721 A | 2/1999 | Norris |
| 5,870,723 A | 2/1999 | Pare |
| 5,873,096 A | 2/1999 | Lim |
| 5,875,437 A | 2/1999 | Atkins |
| 5,878,403 A | 3/1999 | Agrawal |
| 5,897,621 A | 4/1999 | Boesch et al. |
| 5,899,982 A | 5/1999 | Randle |
| 5,910,988 A | 6/1999 | Ballard |
| 5,911,135 A | 6/1999 | Atkins |
| 5,913,202 A | 6/1999 | Motoyama |
| 5,918,217 A | 6/1999 | Maggioncalda |
| 5,920,848 A | 7/1999 | Schutzer |
| 5,926,800 A | 7/1999 | Baronowski et al. |
| 5,930,764 A | 7/1999 | Melchione |
| 5,930,775 A | 7/1999 | McCauley |
| 5,930,776 A | 7/1999 | Dykstra |
| 5,940,811 A | 8/1999 | Norris |
| 5,940,812 A | 8/1999 | Tengel et al. |
| 5,963,953 A | 10/1999 | Cram et al. |
| 5,966,699 A | 10/1999 | Zandi |
| 5,970,482 A | 10/1999 | Pham |
| 5,970,483 A | 10/1999 | Evans |
| 5,983,206 A | 11/1999 | Oppenheimer |
| 5,987,434 A | 11/1999 | Libman |
| 5,987,436 A | 11/1999 | Halbrook |
| 5,991,750 A | 11/1999 | Craig |
| 5,995,947 A | 11/1999 | Fraser |
| 6,012,044 A | 1/2000 | Maggioncalda et al. |
| 6,014,645 A | 1/2000 | Cunningham |
| 6,014,646 A | 1/2000 | Vallee et al. |
| 6,029,139 A | 2/2000 | Cunningham et al. |
| 6,029,149 A | 2/2000 | Dykstra |
| 6,032,137 A | 2/2000 | Hallard |
| 6,055,517 A | 4/2000 | Friend et al. |
| 6,078,905 A | 6/2000 | Pich-LeWinter |
| 6,088,686 A | 7/2000 | Walker et al. |
| 6,105,007 A | 8/2000 | Norris |
| 6,108,644 A | 8/2000 | Goldschlag et al. |
| 6,112,190 A | 8/2000 | Fletcher et al. |
| 6,128,603 A | 10/2000 | Dent et al. |
| 6,134,530 A | 10/2000 | Bunting et al. |
| 6,144,948 A | 11/2000 | Walker et al. |
| 6,167,383 A | 12/2000 | Henson |
| 6,185,543 B1 | 2/2001 | Galperin et al. |
| 6,202,053 B1 | 3/2001 | Christiansen et al. |
| 6,208,979 B1 | 3/2001 | Sinclair |
| 6,216,115 B1 | 4/2001 | Barrameda et al. |
| 6,233,566 B1 | 5/2001 | Levine et al. |
| 6,249,775 B1 | 6/2001 | Freeman et al. |
| 6,260,026 B1 | 7/2001 | Tomida et al. |
| 6,272,528 B1 | 8/2001 | Cullen et al. |
| 6,311,169 B2 | 10/2001 | Duhon |
| 6,324,524 B1 | 11/2001 | Lent et al. |
| 6,339,766 B1 | 1/2002 | Gephardt |
| 6,343,279 B1 | 1/2002 | Bissonette et al. |
| 6,352,206 B1 | 3/2002 | Ashley et al. |
| 6,374,230 B1 | 4/2002 | Walker et al. |
| 6,385,594 B1 | 5/2002 | Lebda et al. |
| 6,405,181 B2 | 6/2002 | Lent et al. |
| 6,422,462 B1 | 7/2002 | Cohen |
| 6,502,080 B1 | 12/2002 | Eichorst et al. |
| 6,505,176 B2 | 1/2003 | DeFrancesco, Jr. et al. |
| 6,529,187 B1 | 3/2003 | Dickelman |
| 6,556,979 B1 | 4/2003 | Liu et al. |
| 6,567,791 B2 | 5/2003 | Lent et al. |
| 6,578,761 B1 | 6/2003 | Spector |
| 6,587,841 B1 | 7/2003 | DeFrancesco et al. |
| 6,601,034 B1 | 7/2003 | Honarvar et al. |
| 6,691,094 B1 | 2/2004 | Herschkorn |
| 6,805,287 B2 | 10/2004 | Bishop |
| 6,898,636 B1 | 5/2005 | Adams et al. |
| 6,910,020 B2 | 6/2005 | Oyama et al. |
| 7,249,076 B1 | 7/2007 | Pendleton et al. |
| 2001/0011255 A1 | 8/2001 | Asay et al. |
| 2001/0037289 A1 | 11/2001 | Mayr et al. |
| 2001/0047313 A1 | 11/2001 | Kanai |
| 2001/0047489 A1 | 11/2001 | Ito et al. |
| 2002/0007341 A1 | 1/2002 | Lent et al. |
| 2002/0013728 A1 | 1/2002 | Wilkman |
| 2002/0032645 A1 | 3/2002 | Nozaki et al. |
| 2002/0038277 A1 | 3/2002 | Yuan |
| 2002/0038363 A1 | 3/2002 | MacLean |
| 2002/0048369 A1 | 4/2002 | Ginter et al. |
| 2002/0052833 A1 | 5/2002 | Lent et al. |
| 2002/0052836 A1 | 5/2002 | Galperin et al. |
| 2002/0052842 A1 | 5/2002 | Schuba et al. |
| 2002/0062282 A1 | 5/2002 | Kight et al. |
| 2002/0062285 A1 | 5/2002 | Amann et al. |
| 2002/0069159 A1 | 6/2002 | Talbot et al. |
| 2002/0087468 A1 | 7/2002 | Ganesan et al. |
| 2002/0091628 A1 | 7/2002 | Kunimatsu |
| 2002/0091635 A1 | 7/2002 | Dilip et al. |
| 2002/0103749 A1 | 8/2002 | Agudo et al. |

| | | | |
|---|---|---|---|
| 2002/0123960 | A1 | 9/2002 | Ericksen |
| 2002/0184140 | A1 | 12/2002 | Quaile et al. |
| 2002/0188556 | A1 | 12/2002 | Colica et al. |
| 2003/0004866 | A1 | 1/2003 | Huennekens et al. |
| 2003/0004868 | A1* | 1/2003 | Early et al. ............... 705/39 |
| 2003/0046222 | A1 | 3/2003 | Bard et al. |
| 2003/0046223 | A1 | 3/2003 | Crawford et al. |
| 2003/0101131 | A1* | 5/2003 | Warren et al. ............. 705/38 |
| 2003/0101133 | A1 | 5/2003 | DeFrancesco, Jr. et al. |
| 2003/0120586 | A1 | 6/2003 | Litty |
| 2003/0135448 | A1 | 7/2003 | Aguias et al. |
| 2003/0135449 | A1 | 7/2003 | Xu et al. |
| 2003/0135450 | A1 | 7/2003 | Aguais et al. |
| 2003/0135451 | A1* | 7/2003 | O'Brien et al. ........... 705/38 |
| 2003/0140000 | A1 | 7/2003 | Lee |
| 2003/0176931 | A1 | 9/2003 | Pednault et al. |
| 2003/0195840 | A1 | 10/2003 | Xu |
| 2003/0208439 | A1* | 11/2003 | Rast ......................... 705/38 |
| 2003/0212618 | A1* | 11/2003 | Keyes et al. .............. 705/35 |
| 2003/0229582 | A1 | 12/2003 | Sherman et al. |
| 2004/0030667 | A1 | 2/2004 | Xu et al. |
| 2004/0044615 | A1 | 3/2004 | Xue et al. |
| 2004/0148211 | A1* | 7/2004 | Honarvar et al. ........... 705/7 |
| 2004/0153384 | A1* | 8/2004 | Whipple et al. ........... 705/35 |
| 2004/0223476 | A1 | 11/2004 | Jose et al. |
| 2005/0096950 | A1 | 5/2005 | Caplan et al. |
| 2005/0097036 | A1 | 5/2005 | White et al. |
| 2006/0097036 | A1* | 5/2006 | Koenigsman et al. ....... 235/379 |
| 2006/0184435 | A1* | 8/2006 | Mostowfi ................... 705/35 |

FOREIGN PATENT DOCUMENTS

| | | |
|---|---|---|
| WO | 02/03226 | 1/2002 |

OTHER PUBLICATIONS

Automated Capture for Forms & Documents, Cardiff Teleform Elite, Copyright 1991-2000.

Credit Line Optimization, A Marketswitch Paper, Marketswitch Corporation, www.marketswitch.com, Copyright 2002, 6 Pages.

Paradi et al.; Using DEA and Negative DEA in Credit Risk Evaluation, Journal of Productivity Analysis, vol. 21, 2004, pp. 153-165.

Banasiak; Integrating Predictive Scoring Technology, 12th Annual Credit Card Collections Conference; Oct. 15, 2003-Oct. 17, 2003.

Fast Start Scoring Models, Scorex, http://www.scorex.com/us/home.html, Copyright 2003, Jun. 25, 2005.

Hubbard et al.; Nextgen FICO Scores: More Predictive Power in Account Management, A Fair Isaac Paper, Sep. 1, 2001.

TRIAD Adaptive Control System-Version 7, Fair Isaac, Copyright 2003, Jun. 25, 2005.

Strategy Science Executive Brief, Fair Isaac, Copyright Jun. 2003, Jun. 1, 2003.

Credit Score Accuracy and Implications for Consumers, Consumer Federation of America National Credit Rep, Dec. 17, 2002.

NAESB-SUIS Creditworthiness Principles Draft #1, NAESB-SUIS, Dec. 9, 2002.

Hickman et al.; An Evolutionary Leap in Credit Portfolio Risk Modeling, Dec. 18, 2002.

Rusnak, Raymond; Subprime Auto Finance, What'S the Fuss?, What'S the Future, A Credit Perspective, The Journal of Lending & Credit Risk Management, pp. L 23-30, April 1997.

Raines Calls for Open System With Lender Access With Multiple Automated Underwriting Systems; Pledges to Waive Du Fees on Market Expansion Products; Announces Partnership With MBA on Technology, Lender Profitability Issues, Business Editors, Business Wire.

E-Aid Office 2000: Financial Aid Software Selection, Implementation, and Operation, Copyright 2000 by the National Association of Student Financial Aid Administrators, Jun. 2000, No. 12, pp. 1-29.

Tebbe, Mark; If Bankers Can Use the Internet to Make Big Bucks, Why Can't You?, (Between the Lines), Sep. 29, 1997, Infoworld, vol. 19, No. 39, p. 152.

Corporate EFT Report, Internet Promises Lower Cost Loan Syndications Intralink Replaces Paper With Online Access, Nov. 12, 1997, vol. 17, Issue 21, Phillips Business Information.

CFO Alert, New Medium Brewing for Syndications, Mar. 23, 1998, vol. 5, No. 121, ISSN: 0894-4822.

Scorex Launches New Credit Line Optimization Consulting Service, Scorex, Press Release, Oct. 27, 2003.

* cited by examiner

METHOD AND APPARATUS FOR MANAGING CREDIT LIMITS

CROSS-REFERENCE TO RELATED APPLICATIONS

This application claims the benefit of U.S. Provisional application No. 60/631,813, filed Nov. 30, 2004, the entire disclosure of which is hereby incorporated herein by reference. This application is also related to: U.S. Nonprovisional application entitled, "System and Method for Routing Information for Evaluating a Financial Transaction," by Whitaker et al., and filed on May 25, 2005 assigned Ser. No. 11/137,644, U.S. Nonprovisional application entitled, "Method and Apparatus for Evaluating a Financial Transaction," by Cox et al., filed concurrently with this application, assigned Ser. No. 11/109,204, the entire disclosure of which is hereby incorporated herein by reference; and U.S. Nonprovisional application entitled, "Method and Apparatus for Managing Risk," by Cox et al., filed concurrently with this application, assigned Ser. No. 11/109,203, the entire disclosure of which is hereby incorporated herein by reference.

FIELD OF THE INVENTION

This invention relates to evaluating financial transactions. In an embodiment of the invention, the financial transactions involve credit requests and the evaluating includes determining whether to approve the credit requests.

BACKGROUND OF THE INVENTION

Large financial institutions provide financing for countless numbers of customers, including individual customers and companies. In the case where a financial institution provides financing for companies, credit requests can be for amounts in the tens, if not hundreds of millions of dollars. Further, financial institutions can receive a great number of these requests in a short amount of time, and decisions on these requests are often needed rapidly. Conventionally, however, decisions on these credit requests are reserved for the top credit executives, which are few in number. Accordingly, a typical financial institution often has a small team of credit executives empowered to approve high exposure requests, i.e., requests for a large amount of credit that would expose the financial institution to a significant amount of risk. This combination of having a small number of credit executives in proportion to the number of incoming requests creates a bottleneck in the approval process.

Therefore, a need in the art exists for a way to decrease the response time for credit requests while maintaining the integrity of the process of evaluating these requests in order to ensure that proper decisions are being made.

SUMMARY OF THE INVENTION

These problems are addressed and a technical solution achieved in the art by a system and method for evaluating financial transactions. According to an embodiment of the invention, the financial transactions involve credit requests. In this embodiment, the credit requests are categorized into three tiers. The third-tier is for requests that are permitted to be processed, at least in part, by computers. These requests may be low risk, i.e., involve low exposure and/or little complexity. The second-tier is for requests that meet predefined criteria and cannot be categorized as third-tier requests. Second-tier requests may involve more risk than third-tier requests. The first-tier is for requests that cannot be categorized as second-tier or third-tier requests. First-tier requests may involve more risk than the second and third-tier requests.

The first-tier requests are manually reviewed by a credit executive. The second-tier requests are delegated and routed to more junior credit personnel via an inventive pre-approval procedure that utilizes a "credit appetite" feature. According to an embodiment of the invention, this pre-approval procedure involves a credit executive predefining credit appetites, or maximum exposure amounts, for particular clients, countries, industries, products, and/or durations ("tenors"). Junior credit personnel are given authority to approve requests having characteristics matching a predefined credit appetite. A credit executive may specify a level of authority required by a junior personnel in order to approve a credit request matching a particular credit appetite. Accordingly, if a request is received having characteristics matching a predefined credit appetite, it is routed to an appropriate junior personnel having enough authority to approve the request.

The third-tier requests must be eligible for processing, at least in part, by computers. For instance, a request may have to have characteristics that have been predetermined to be low complexity, low exposure, and, consequently, low risk to be processed according to the third-tier. By processing requests, at least in part, by computers, the amount of human interaction required to approve these requests is reduced, while not increasing the risk of erroneous approvals.

According to an embodiment of the invention, requests that exceed a client's credit line, or limit, may be approved by reallocating credit from other credit lines assigned to the client. Optionally, if a request exceeds a credit line, the request may be approved by increasing the credit line, which may be performed by computers, if the credit appetite associated with the request will not be exceeded by such increase. Optionally, if a request exceeds the credit appetite, the request may be approved manually by a credit executive or by other credit personnel.

According to an embodiment of the invention, if a client has multiple lines of credit, the amount of credit applied to each line of credit may be adjusted based upon the client's usage history of each line of credit. For example, if a first line of credit is used more frequently than a second, the first line of credit may be increased and the second line of credit decreased. Such an adjustment procedure may occur on a periodic basis, thereby allowing a client to be managed on an on-going basis without the need for human interaction.

By allowing a credit executive to define which credit requests may be processed by junior credit personnel and/or computers, and then allowing such requests to be processed by such junior personnel and/or computers without interaction with the credit executive, a vastly larger number of credit requests may be processed while at the same time maintaining the integrity of the credit request evaluation process.

BRIEF DESCRIPTION OF THE DRAWINGS

The present invention will be more readily understood from the detailed description of preferred embodiments presented below considered in conjunction with the attached drawings, of which.

DETAILED DESCRIPTION OF THE EXEMPLARY EMBODIMENT(S) OF THE INVENTION

The present invention allows a credit executive to define what types of credit requests may be approved prior to receipt of such credit requests. In particular, the present invention allows the credit executive to specify that certain types of credit requests may be approved by junior credit personnel or even by computers. Any request type that has not been specifically identified for approval by junior personnel or by computers are reserved for approval by the credit executive. Accordingly, more requests may be processed than the credit executive could have processed alone manually. Further, the risk of erroneous approvals is not increased, because any request approved by junior credit personnel or by a computer has, in effect, been pre-approved by the credit executive, thereby maintaining the integrity of the credit request evaluation process.

According to an embodiment of the present invention, credit lines assigned to a client may be adjusted by computers, either at the time a credit request is made, or at predetermined times. This adjustment allows credit requests that exceed a credit line to be approved. For example, reallocation of the limits of the client's credit lines reduces the chance that a credit request will be denied because it exceeds a credit line. Accordingly, the amount of human interaction required to manage the client is further reduced.

Figure 1:
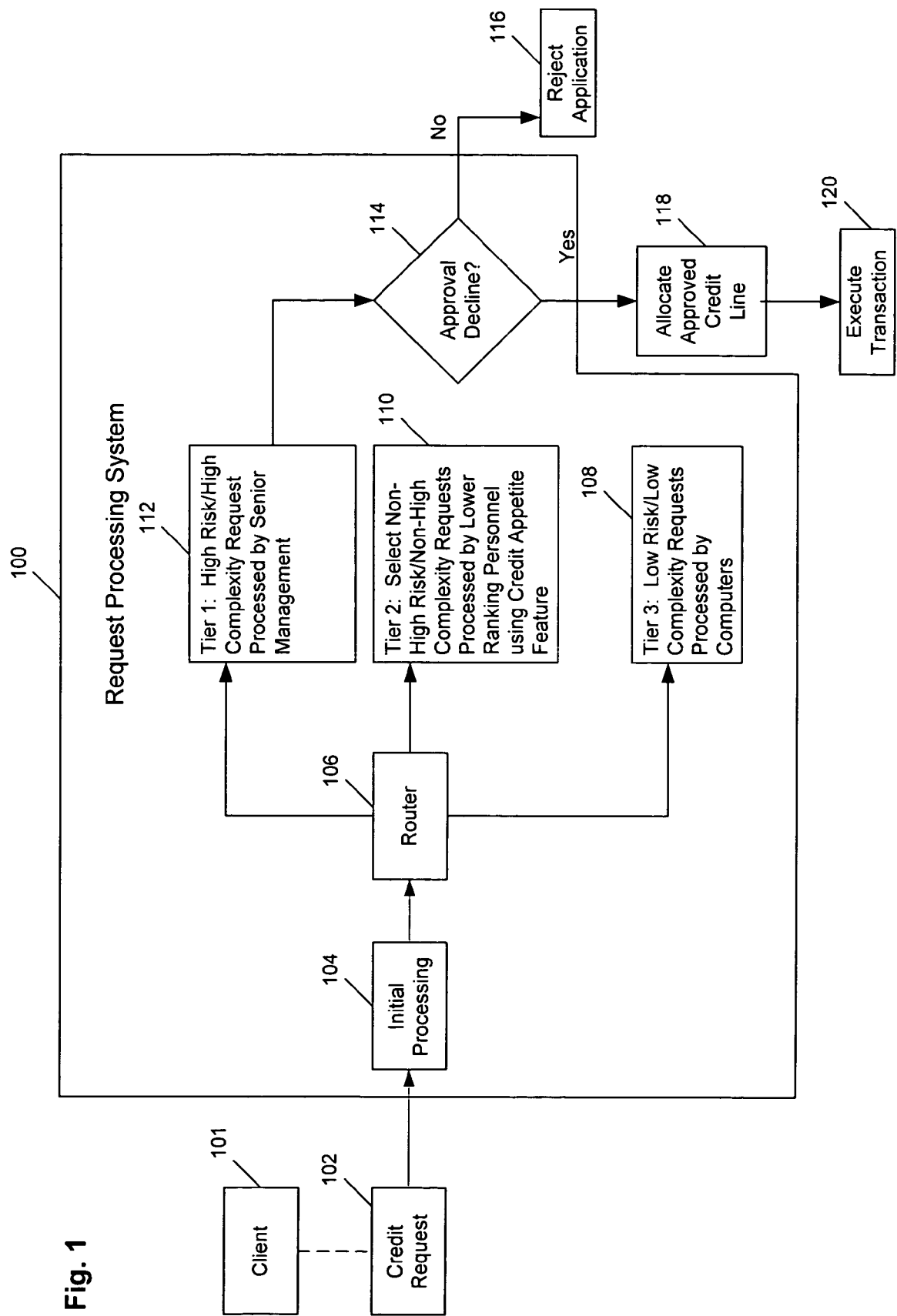
FIG. 1 illustrates an overview of a system and a method for evaluating financial transactions, according to an embodiment of the present invention.

FIG. 1 illustrates an overview of an embodiment of the present invention. According to this embodiment, a financial transaction involves a credit request 102 from a client 101 that is evaluated by a request processing system 100. At step 114, the request processing system 100 determines whether to approve the request 102, and, if so, how much credit to allocate to the request 102. If the request 102 is declined at step 114, the request is rejected at step 116. If the request 102 is approved at step 114, then at step 118 a credit amount approved for the request 102 is allocated to the client 101. Once the credit amount is allocated at step 118, the transaction associated with the request 102 is executed at step 120.

An overview of the process by which the request processing system 100 ultimately determines at step 114 whether to approve the request 102 and, if so, how much credit to allocate to the request 102, will now be described. After the request 102 is received by the system 100, initial processing is performed on the request 102 at step 104. The initial processing at step 104 includes determining risk ratings, credit appetites, and initial credit-line limits for the client 101. As will be discussed below, risk ratings are used to assist in determining credit appetites and initial credit-line limits. The initial processing at step 104 will be described in further detail below with reference to FIG. 3.

After the initial processing at step 104 is complete, a determination is made by a router 106 as to how the request 102 should be processed. According to an embodiment of the present invention, the request 102 is processed in one of three ways, depending upon characteristics of the request 102. Requests that are permitted to be processed, at least in part, by computers are classified as third-tier requests 108. It may be that third-tier requests 108 are deemed low risk because they involve a low exposure amount and/or have low complexity. Requests meeting predefined criteria and are not classified as third-tier requests 108 are classified as second-tier requests 110. It may be that second-tier requests 110 involve more risk than third-tier requests 108. Requests that are not classified as second-tier requests 110 or third-tier requests 108 are classified as first-tier requests 112. It may be that first-tier requests 112 involve more risk than second-tier requests 110. The process of classifying requests and routing them to the appropriate individuals/computers for processing is described in detail below with reference to FIGS. 2, 4, and 5.

Whether processed as first-tier requests 112, second-tier requests 110, or third-tier requests 108, processing of requests results in an approve/decline decision at step 114. If a request is approved, it is approved for a particular amount of credit, which may be less or more than what was requested.

The request processing system 100 involves a combination of computers and individuals. For instance, a credit executive may receive the request 102 in an electronic format from the router 106 as a first-tier request 112, evaluate the request 102 on a computer, and the computer may transmit the credit executive's decision at step 114. The same may be true for processing of second-tier requests 110 by junior credit personnel. Third-tier requests 108 also may involve processing by both individuals and computers. However, third-tier requests 108 advantageously include less involvement by computers in the evaluation process than second-tier requests 110 and first-tier requests 112. More advantageously, evaluation of third-tier requests 108 involves only computers. One skilled in the art, however, will appreciate that the present invention is not limited to any particular computer arrangement, except that third-tier requests 108 are processed in a more automated fashion by computers than first-tier requests 112 and second-tier requests 110.

The request 102 may be submitted to the system 100 electronically or manually, via a paper application. If the request 102 is a paper application, the initial processing at step 104 may involve personnel who input data pertaining to the request 102 into one or more computers. The initial processing performed at step 104, processing by the router 106, and processing of third-tier requests 108 may be performed by one or more computers. In particular, the initial processing at step 104, processing by the router 106, and processing of third-tier requests 108 may be performed by a single computer or multiple computers. Any computer(s) used by the system 100 may be communicatively connected through a network, whether through wired connections, wirelessly, or a combination of both. One skilled in the art will appreciate, however, that the present invention is not limited to any particular computer arrangement used to implement the system 100. The term "computer" is intended to include any data processing device, such as a desktop computer, a laptop computer, a mainframe computer, a personal digital assistant, and/or any other device for processing data, whether implemented with electrical and/or magnetic and/or optical components, or otherwise.

The framework by which a request 102 is classified as first-tier, second-tier, or third-tier will now be described. The present invention ensures the integrity of the request evaluation process by allowing a credit executive to predefine to which tier a request should be assigned. For example, the credit executive, or some other decision making entity, may specify that he or she is willing to approve, without his or her personal review, all requests from Company "X" for a transaction of type "Y" in an amount of $10 million or less, for example. The amount $10 million in the example is referred to herein as a "credit appetite." The process of defining a credit appetite associated with particular parameters, such as the company and/or transaction type involved, acts as a pre-approval process. Predefined credit appetites are used, in part, by the router 106 to determine which tier the request 102 is to be classified. For example, when a request 102 is received from Company "X" for a transaction of type "Y" in an amount of less than $10 million, and credit appetite corresponding to this request 102 is $10 million, the router 106 knows that this request 102 need not be classified as a first-tier request 112, because it corresponds to a credit appetite that exceeds the amount of the request 102. However, additional criteria assists the router 106 in determining whether the request 102 is to be classified as a second-tier request 110 or a third-tier request 108. For instance, the credit executive or some other decision making entity may specify that only particular transaction types with an amount of less than, for example, $5 million may be processed as third-tier requests 108. Accordingly, in this example, because the request 102 is greater than $5 million, it is not classified as a third-tier request 108, but is classified as a second-tier request 110 and routed to an appropriate junior personnel for processing.

Although embodiments of the present invention are described with reference to particular criteria used to determine whether requests should be first-, second-, or third-tier requests, such criteria is used for illustration purposes only. One skilled in the art will appreciate that what is important is that a decision-making entity defines any criteria that the decision-making entity is comfortable with for assigning credit requests to particular individuals, groups of individuals, and/or computers for evaluation. Further, the concept of having three tiers for evaluation is used as an illustration for delegating evaluation of financial transactions, which may be credit requests, to particular individuals, groups of individuals, and/or computers. Accordingly, one skilled in the art will appreciate that the invention is not limited to a three-tier system.

Figure 2:
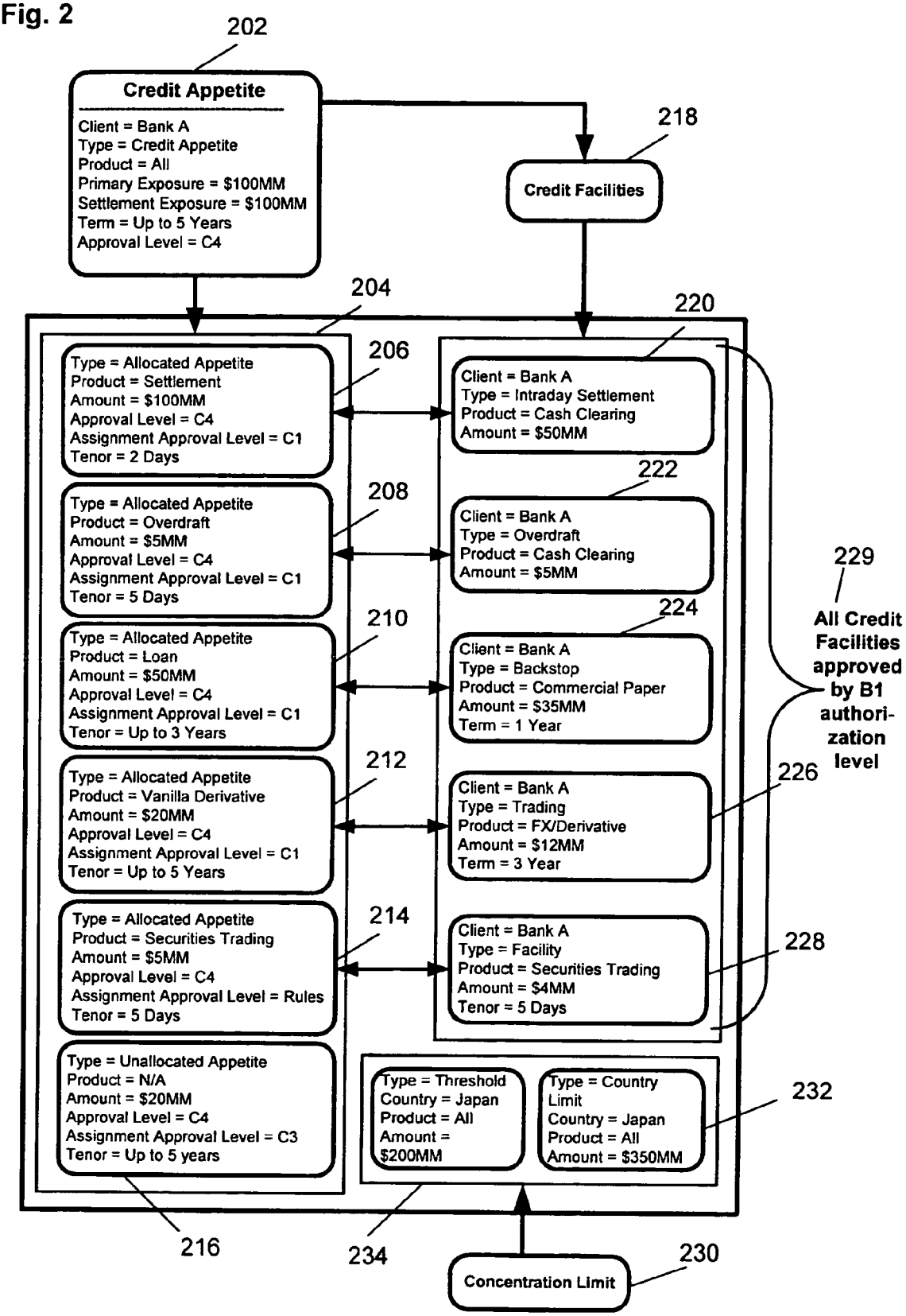
FIG. 2 illustrates a credit appetite feature, according to an embodiment of the present invention.

The "credit appetite" feature according to an embodiment of the present invention will now be described in detail with reference to FIG. 2. FIG. 2 illustrates an example of a single credit appetite 202 for a customer, or client, "Bank A." Although only one credit appetite 202 is illustrated in FIG. 2, multiple credit appetites may be, and are advantageously present. Credit appetites may be created for a client generally, for a client when participating in one or more types of transactions ("products"), or for a client when participating in a transaction having a specified term, called "tenor." One skilled in the art will appreciate, however, that credit appetites may be associated with request characteristics or criteria other than client, product, and/or tenor, and that the present invention is not limited to any particular characteristic(s).

In the example of FIG. 2, the credit appetite 202 applies to requests from the client "Bank A," for all products having a term of less than 5 years in an amount of $200 million or less. The $200 million credit appetite is calculated as the sum of the $100 million primary exposure amount and the $100 million settlement amount. Also part of the credit appetite 202 is an indication of what level of authority is required to approve allocation of the credit appetite. According to an embodiment of the present invention, the highest level of authority, such as a CEO level of authority, is identified as C6. Just below C6 is C5, and just below C5 is C4, etc. C1 is greater than B6, and B5 is just below B6, etc. One skilled in the art will appreciate, however, that any convention of identifying individuals of a certain authority level may be used. In the credit appetite 202, the minimum level of authority required to allocate the entire credit appetite of $200 million is C4. To approve an amount in excess of the $200 million, approval from an individual with an authority level greater than C4 may be required. To summarize, the credit appetite 202 indicates that the credit executive who created the credit appetite 202 has indicated a willingness to be exposed to financing a maximum amount of $200 million to Bank A, regardless of product, as long as the term is less than or equal to 5 years, and as long as someone having an authority level, at a minimum, of C4 approves the request 102.

The credit appetite 202 represents a pre-approved maximum amount of exposure. The credit executive may subdivide this credit appetite 202 into smaller amounts, as shown at box 204 in FIG. 2. Therefore, the overall credit appetite 202 may include one or more allocated appetites, shown for example at boxes 206, 208, 210, 212, and 214 in FIG. 2, and an unallocated appetite, shown for example at box 216 in FIG. 2. In the example of FIG. 2, the overall credit appetite 202 equals the sum of all allocated and unallocated appetites. However, the sum of all allocated and unallocated appetites may exceed the credit appetite 202, as long as the actual total exposure does not exceed the credit appetite 202 without appropriate approval.

The allocated appetite 206 applies to a credit request for a settlement product from Bank A for a maximum amount of $100 million with a tenor of 2 days. If a request 102 is received that matches the characteristics of the allocated appetite 206, i.e., is from Bank A for a settlement product in an amount less than $100 million for less than 2 days, approval by someone with a minimum authority level of C1 is required. This minimum authority level is specified by the "Assignment Approval Level" indicator in the allocated appetite 206. If a credit request 102 is received from Bank A for a settlement product in an amount greater than $100 million and/or for a tenor greater than 2 days, approval by someone with a minimum authority level of C4 is required, as shown by the "Approval Level=C4" entry in the allocated appetite 206. The allocated appetite 206 allocates all of the settlement amount of the overall credit appetite 202. In summary, if a request 102 is received having characteristics that match the criteria of the allocated appetite 206, it may be routed to and approved by someone with an authority level of at least B1 without requiring interaction with the credit executive who created the credit appetite, thereby saving the credit executive's time.

The allocated appetite 208 applies to a request from Bank A for an overdraft product in an amount of $5 million with a tenor of 5 days and requires approval of someone with an authority level of C1. If a request 102 is received from Bank A for an overdraft product in an amount greater than $5 million or for a tenor greater than 5 days, approval by someone with a minimum authority level of C4 is required, as shown by the "Approval Level=C4" entry in allocated appetite 208. The allocated appetites 210 and 212 have their own amounts, approval levels, and tenors, and apply to requests from Bank A pertaining to loan products, plain derivatives products, and securities trading products, respectively. The allocated appetite 214, which applies to a securities trading product, may be approved according to a third-tier request 108, as indicated by the "Assignment Approval Level=Rules" entry in the allocated appetite 214.

In the example of FIG. 2, the unallocated appetite 216 represents the difference between the overall credit appetite of the credit appetite 202 and the sum of the amounts of the allocated appetites 206, 208, 210, 212, and 214. However, this need not be the case. The characteristics of the unallocated appetite 216 indicate that it applies to requests 102 from Bank A regardless of product type, having a tenor of less than or equal to 5 years. Approval of requests 102 that match the criteria of the unallocated appetite 216 requires approval of someone having an authority level of at least C3. Approval of a request 102 that matches the criteria of the unallocated appetite 216, but exceeds $20 million or a tenor of 5 years must be approved by someone having an authority level of at least C4.

One or more credit lines, or "credit facilities" may be provided to a client, in this example, Bank A, out of the allocated and/or unallocated appetites. As shown in FIG. 2, several credit facilities 218 are approved for Bank A. In particular, an intraday settlement credit facility 220 of $50 million is approved for Bank A. The credit facility 220 is approved out of the allocated appetite 206, and therefore, out of the $100 million allocated to the appetite 206, $50 million remains. An overdraft credit facility 222 of $5 million is approved for Bank A out of the $5 million of the allocated appetite 208. Accordingly, the allocated appetite 208 has no additional amount to allocate. A commercial paper ("CP") backstop credit facility 224 of $35 million having a loan term of 1 year is approved for Bank A out of the allocated appetite 210, leaving $15 million of appetite remaining. (The CP backstop product is a type of loan.) A trading facility 226 for FX/Derivative products, a type of derivative, in an amount of $12 million and a term of 3 years has been approved for Bank A out of the allocated appetite 212 for derivatives. Accordingly, $8 million of appetite remains for the appetite 212. As a final example, a credit facility 228 for securities trading in an amount of $4 million has been approved from the appetite 214, leaving $1 million remaining.

As shown at item 229 in FIG. 2, if a request 102 is received that matches or is within an existing credit facility, and does not exceed the credit facility, the request 102 may be approved by someone having an authority level of B1. For example, if the request 102 is from Bank A for an Intraday Settlement of $10 million, someone having an authority level of at least C1 may approve the request from the facility 220. However, if approving the request 102 would exceed an applicable facility, the facility may be extended up to an amount specified by a corresponding allocated appetite, if approved by someone having at least the authority level specified by the corresponding allocated appetite (C1 in this example). To use the previous example, if the request 102 is for more than $50 million, the facility 218 may be extended up to $100 million if approved by someone having at least an authority level of C1, as specified by the corresponding allocated appetite 206.

If approving the request 102 would exceed the allocated appetite associated with the request 102, the facility may be extended to an amount of the sum of the corresponding allocated appetite and an unallocated appetite, if approved by someone having an authority level specified by the unallocated appetite. To use the previous example, if the request 102 is for an amount of $110 million, the facility 218 may be extended to $110 million if approved by someone having an authority level of at least C3, the "assignment approval level" specified by the unallocated appetite 216.

If approving the request 102 would exceed the allocated appetite and the unallocated appetite, but not the total credit appetite 202, the facility, in this example 218, may be extended to the requested amount upon approval of someone having at least the minimum authority level specified by the "approval level" entry in the allocated appetite 206 and the unallocated appetite 216 (in this case C4).

If approving the request 102 would exceed the total credit appetite 202, approval, in this example, is required from someone having the authority level specified by the "approval entry" in the overall credit appetite 202, in this case also C4.

Concentration limits 230 are additional tools that a credit executive may use to manage exposure of his or her company. A concentration limit is a maximum amount of credit that the credit executive's company is willing to provide to a particular region, industry, etc., and, in certain cases, prevents credit from being issued to a client that has available appetite. Stated another way, anytime a request 102 is received, it is determined whether the request 102 would violate a concentration limit and also whether it would exceed a credit appetite 202. If a request 102 is received that, if approved, would violate a concentration limit, the request 102 may be approved only by an individual with an appropriate authority level. What happens in cases where concentration limits and/or credit appetites are exceeded will be discussed in detail below with reference to FIG. 5. In the example at box 232 in FIG. 2, a $350 million credit exposure limit in Japan, regardless of product type, has been set. At box 234 in FIG. 2, a $200 million "threshold" exposure limit has been set. A "threshold" limit is an industry-based concentration limit preventing, in this example, more than $200 million of credit from being allocated to any particular company in a specific industry.

The information shown in FIG. 2 may be stored in one or more computer-accessible memories. The term "computer-accessible memory" is intended to include any computer-accessible data storage device, whether volatile or nonvolatile, electronic, optical, or otherwise, including but not limited to, floppy disks, hard disks, CD-ROMs, DVDs, flash memories, ROMs, and RAMs.

Figure 3:
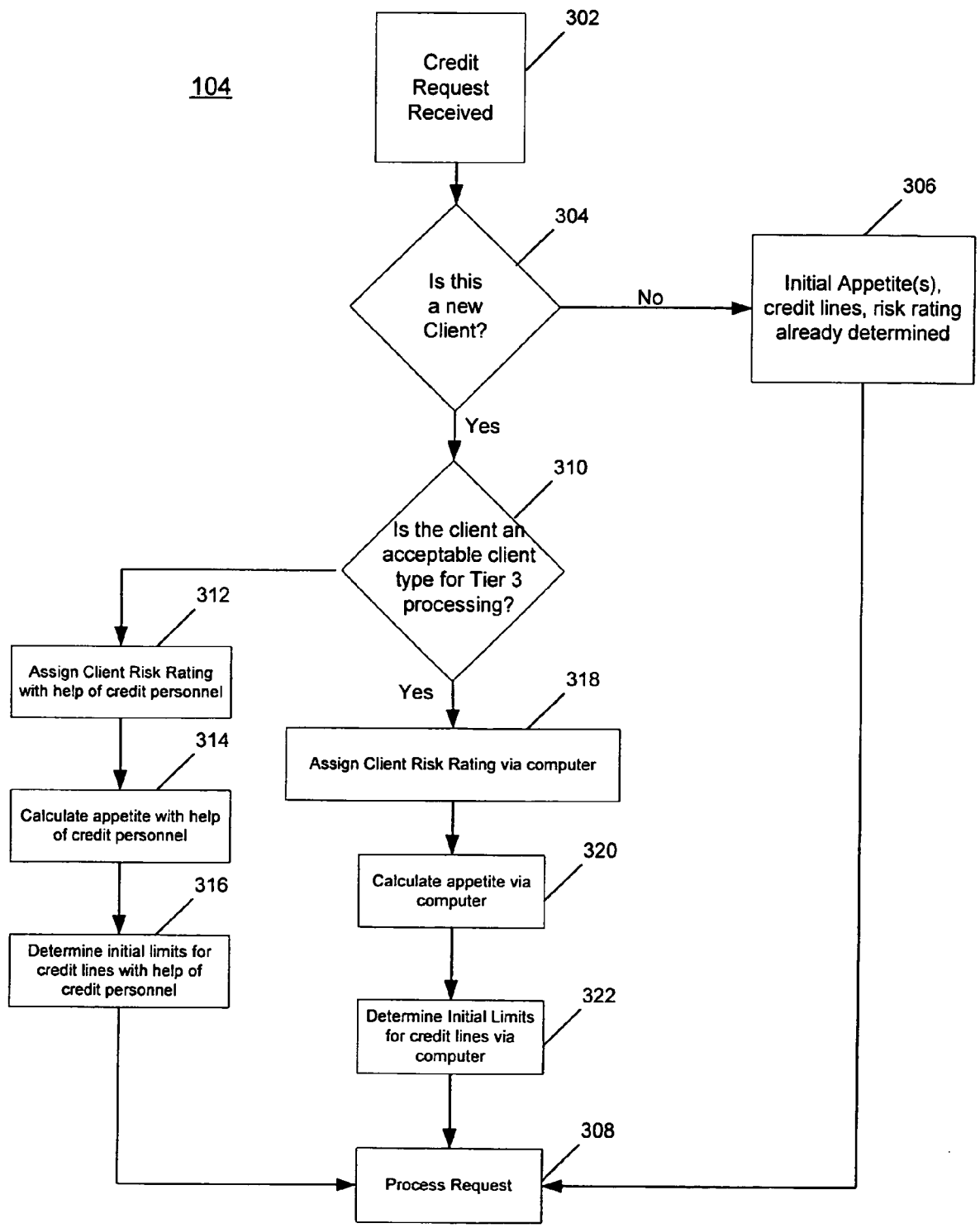
FIG. 3 illustrates a flow of an initial processing procedure, according to an embodiment of the present invention.

Having described the credit appetite feature according to an embodiment of the present invention, which is used to assist in classifying second-tier requests 110 and to route such requests to an appropriate individual, the manner in which a request is processed by the system 100 according to an embodiment of the present invention will now be described in detail. FIG. 3 illustrates a flow of the initial processing at step 104 in FIG. 1. The goal of the initial processing at step 104 is to determine a risk rating, appetite(s), and credit facilities associated with a client submitting the request 102. For new clients, a risk rating, appetite(s), and a credit facility or facilities are determined. If the client is an existing client, the risk rating, appetite(s), and a credit facility or facilities already exist, when necessary, and need not be determined.

In particular, the request 102 is received by the request processing system 100 at step 302. At step 304, it is determined whether the client submitting the request 102 is new to the system 100. If the client is not new, a risk rating, appetite(s), and credit facility/facilities will already have been determined, when necessary, as shown at step 306. From step 306, processing of the request 102 occurs at step 308, which is described in detail below with reference to FIG. 5.

If the client is new, as determined at step 304, then it is determined at step 310 whether characteristics of the request 102 allow it to be processed as a third-tier request 108. Step 310 is described in detail below with reference to FIG. 4. If the request 102 cannot be processed as a third-tier request 108, a risk rating, one or more appetites, and one or more credit facilities are manually assigned, when necessary, by credit personnel at steps 312, 314, and 316, respectively. If the request 102 may be processed as a third-tier request 108, a risk rating, one or more appetites, and one or more facilities may be assigned to the client by or with the assistance of one or more computers at steps 318, 320, and 322, respectively. Although not necessary, it may be advantageous to have the processing performed at steps 318, 320, and 322 performed solely by computers. The processing at steps 314, 316, 320, and 322 results in generation of credit appetites and credit lines ("facilities") shown, for example, in FIG. 2. Having assigned the risk rating, appetite(s), and facility/facilities to the client, where necessary, the request 102 is processed at step 308.

Figure 4:
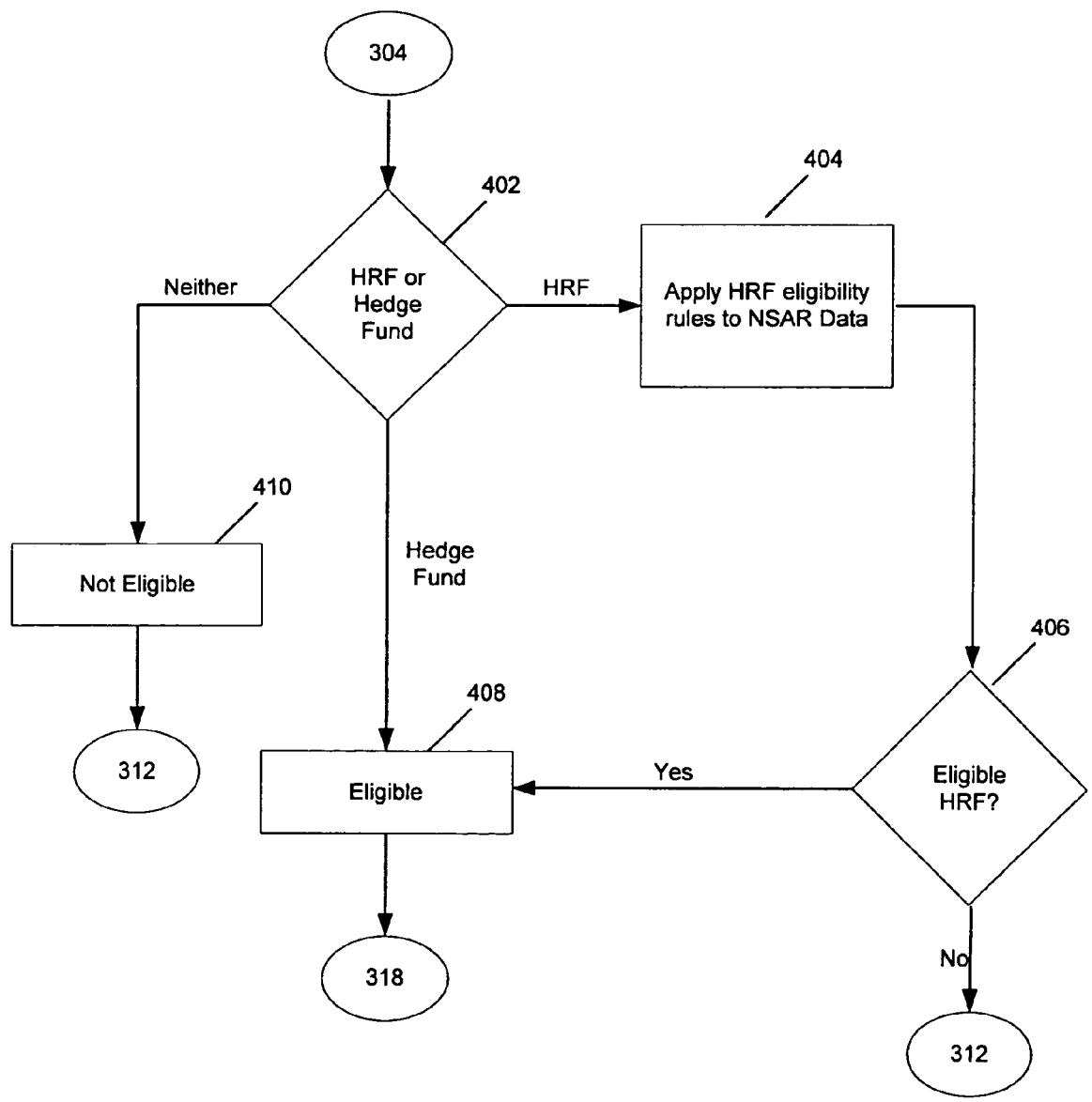
FIG. 4 illustrates a flow of a procedure for determining whether a new client is acceptable for third-tier processing, according to an embodiment of the present invention.

The determination made at step 310 in FIG. 3 according to an embodiment of the present invention now will be described in detail with reference to FIG. 4. According to this embodiment, an initial determination at step 402 is made as to whether or not a client submitting the request 102 is a Highly Regulated Fund ("HRF") or a Hedge Fund. An HRF is a highly-regulated investment fund. Most mutual funds are HRFs. A hedge fund is a relatively high-risk and low-regulation investment fund. Hedge funds are categorized into two major groups: large, well known companies are called Full Credit companies and have relatively lower risk. The Full Credit companies require a Hedge Fund Full Credit Agreement ("HFFCA"). An HFFCA is a standard agreement, known in the art, that specifies characteristics of Full Credit hedge funds. Smaller, less-known companies, are categorized as Hedge Fund Rule ("HFR") companies. This categorization may be done manually. Depending on the type of hedge fund, different credit-line amounts are assigned, as will be discussed below. Because Highly Regulated Funds and Hedge Funds are well structured and codified, the amount of risk involved with them is well known, making them suitable for third-tier processing. One skilled in the art will appreciate, however, that third-tier processing is not limited to HRFs and hedge funds, and that any other client type may be used depending upon the amount of risk a credit executive or other decision-making entity is willing to delegate to computer-based evaluation systems.

If, at step 402, the client 101 submitting the request 102 is to be treated as an HRF, the client's NSAR data, known in the art, is compared against HRF eligibility rules at step 404 to determine whether the client 101 is an eligible HRF. The HRF eligibility rules may verify that the manager of the client's fund is on an approved fund manager list, that the fund is diversified, that the fund is open-ended, that the fund does not trade derivatives, and/or that the fund has a net asset value of greater than or equal to $10 million as evaluated within the last 180 days. According to an embodiment of the present invention, if the fund does not meet all of these criteria, it is determined to be an ineligible HRF and, consequently, ineligible for third-tier processing at step 406, thereby advancing processing to step 312 in FIG. 3. On the other hand, if the fund meets all of these criteria, it is determined to be an eligible HRF and, consequently, eligible for third-tier processing at step 408, thereby advancing processing to step 318 in FIG. 3.

If, at step 402, the client submitting the request 102 is to be treated as a Hedge Fund, it is determined to be eligible for third-tier processing at step 408, and processing proceeds to step 318 in FIG. 3. If, at step 402, however, the client submitting the request 102 is not to be treated as an HRF or a hedge fund, the request is determined to be ineligible for third-tier processing at 410, and processing proceeds to step 312.

Returning now to step 318 in FIG. 3, if it has been determined that the client submitting the request 102 is an HRF, a low risk rating is assigned. According to an embodiment of the invention, a high risk rating is associated with a level of six, a medium risk rating is associated with a level of five, and a low risk rating is associated with a level of three. One skilled in the art will appreciate, however, that the present invention is not limited to any particular risk rating convention.

If the client is to be treated as a hedge fund, it is determined whether the fund can be managed under a hedge fund rule ("HFR") or if a full credit agreement is required ("HFFCA"). This determination may be made manually and may occur earlier than at step 318. If the fund can be managed under the HFR, it is assigned a high risk rating, which according to an embodiment of the present invention may be a rating of six.

According to an embodiment of the present invention, if a full credit agreement is required, the risk rating is calculated based upon an evaluation of factors that may include the client fund's organization, investment strategy, risk management, liquidity management, capital, performance, internal operations, client communications, and exposure management. For example, this evaluation may be performed according to the parameters of Table I.

TABLE I

| Rating Item | Weight | Weighted Score | 1 | 2 | 3 | 4 | 5 |
|---|---|---|---|---|---|---|---|
| Organization | 5 | 15 | | | x | | |
| Investment Strategy | 25 | 100 | | | | x | |
| Risk Management | 10 | 30 | | | x | | |
| Liquidity Management | 5 | 15 | | | x | | |
| Capital | 20 | 40 | | x | | | |
| Performance | 15 | 60 | | | | x | |
| Internal Operations | 5 | 25 | | | | | x |
| Client Communications | 5 | 25 | | | | | x |
| Exposure Management | 10 | 20 | | x | | | |
| Score | 100 | 330 | | | | | |

In the example of Table I, each of the categories of organization, investment strategy, risk management, liquidity management, capital, performance, internal operations, client communications, and exposure management, are assigned a weight. For each category, the fund is assigned a score from 1 to 5, with 5 being the most favorable and indicating the least amount of risk for that category. Each of the weights are then multiplied by their associated score, thereby resulting in a weighted score. If the total of the weighted scores is greater than 300, then a low risk rating is assigned at step 318, which may be a rating of 4. If the total of the weighted scores is less than or equal to 300 and greater than or equal to 150, then a medium risk rating is assigned at step 318, which may be a rating of 5. And, if the total of the weighted scores is less than 150, then a high risk raring is assigned at step 318, which may be a rating of 6.

At step 320, according to an embodiment of the invention, if the client submitting the request 102 is an HRF, its appetite consists of two parts: primary exposure and settlement exposure. These two parts of the appetite may be determined based on the fund's Net Asset Value ("NAV") according to Table II.

TABLE II

| NAV (in millions) | Maximum Primary Exposure (in millions) | Maximum Settlement Exposure (in millions) |
|---|---|---|
| >$1,000 | $125 | $250 |
| <= $1,000 and >$750 | $100 | $200 |
| <= $750 and >$500 | $80 | $150 |
| <= $500 and >$400 | $70 | $125 |
| <= $400 and >$300 | $60 | $100 |
| <= $300 and >$200 | $50 | $80 |
| <= $200 and >$100 | $40 | $70 |
| <$100 | $25 | $50 |

If the client submitting the request 102 is a hedge fund that may be managed according to the HFR, then the appetite calculated at step 320, according to an embodiment of the present invention, may be calculated as a percentage of NAV. In one embodiment, such percentage may be 7.5%, but one skilled in the art will appreciate that any percentage may be used. The calculated appetite may be capped at $10 million.

For hedge funds that require an HFFCA, the appetite calculated at step 318 may also be a percentage of NAV. However, according to an embodiment of the present invention, the percentage used depends upon the fund's strength of legal documentation, the business risk of the fund's trading lines, and the risk rating assigned at step 318 in FIG. 3. According to this embodiment, determination of the percentage may be made according to Table III, where the fund's strength of legal documentation (referred to as "Legal Docs" in Table III) and the business risk of the fund's trading lines (referred to as "Business Risk" in Table III) are rated on a scale of 1 to 5, where 5 means the strongest legal documentation and the lowest business risk, respectively. However, as discussed with the risk rating assigned at step 318, a risk rating of 6 indicates high risk, a risk rating of 5 indicates medium risk, and a risk rating of 4 indicates low risk.

TABLE III

| Legal Docs | Business Risk | Risk Rating: 4 % NAV | Risk Rating: 5 % NAV | Risk Rating: 6 % NAV |
|---|---|---|---|---|
| 1-2 | 1 | 4 | 3 | 2 |
| 1-2 | 2 | 5 | 4 | 3 |
| 1-2 | 3 | 6 | 5 | 4 |
| 1-2 | 4 | 7 | 6 | 5 |
| 1-2 | 5 | 10 | 8 | 6 |
| 3-5 | 1 | 7 | 6 | 5 |
| 3-5 | 2 | 10 | 8 | 6 |
| 3-5 | 3 | 12 | 10 | 8 |
| 3-5 | 4 | 15 | 12 | 10 |
| 3-5 | 5 | 18 | 15 | 12 |

In the example of Table III, if the fund has a "Legal Docs" rating of 2, a "Business Risk" of 3, and a "Fund Grade" of 5, the appetite may be calculated as 5% of the fund's NAV. However, it may be advantageous to cap the calculated appetite at $50 million.

Some hedge funds are guaranteed by other 'guarantor' hedge funds. In these situations, the guarantor funds may have multiple hedge funds that have been guaranteed. The appetite for a guaranteed fund may be limited by the appetite of the guarantor fund. According to an embodiment of the present invention, such appetite limiting for a guaranteed fund may occur according to the following rules. If the client submitting the request 102 is a guaranteed hedge fund, the appetite calculated at step 320 may be capped at "Remaining Guaranteed Allocation." "Remaining Guaranteed Allocation" may be defined as the appetite of the guarantor fund minus the appetite of all other guaranteed funds for the same guarantor. The "Remaining Guaranteed Allocation" may be capped at $50 million or 5% of the NAV of the guarantor fund, whichever is lower.

Regardless of whether the customer submitting the request 102 is an HRF or a hedge fund, the calculated appetite may be reduced if it violates an industry concentration limit, i.e., the total exposure that an entity operating the system 100 wants to have for a particular industry. For example, a remaining industry appetite may be calculated as the sum of all appetites for all clients in the industry minus the allocated appetites for all clients in the industry. If the appetite calculated at step 320 makes the remaining industry appetite exceed the maximum industry appetite, then the appetite calculated at step 320 is reduced so that it equals the remaining industry appetite.

Further, the appetite calculated at step 320 may also be reduced if it exceeds a country concentration limit, i.e., the total exposure that an entity operating system 100 wants to have for a particular country. For example, a remaining appetite for a country equals the maximum appetite for the country minus the allocated appetite for all other funds in that country. If the appetite assigned to the client 101 submitting the request 102 exceeds the remaining country appetite, then the appetite is reduced to the remaining country appetite.

At step 322, according to an embodiment of the present invention, one or more initial credit lines are allocated to the client submitting the request 102, such that the sum of all credit lines does not exceed a percentage of the appetite calculated at step 320. This percentage may be based upon the risk rating calculated at step 318 according to Table IV.

TABLE IV

| Risk Rating | Margin (%) |
|---|---|
| 4 | 90 |
| 5 | 80 |
| 6 | 75 |

For example, if the risk rating calculated at step 318 is 4, and the appetite calculated at step 320 is $10 million, then the sum of all credit lines assigned to the client submitting the request 102 may not exceed $8 million.

After calculating the total amount to be allocated across all credit lines ("Total Amount"), then the amount allocated to each requested credit line may equal the Total Amount divided by the number of credit lines. However, one skilled in the art will appreciate that the present invention is not limited to this example and that the present invention is not limited to any particular method for allocating credit among multiple credit lines. The amount allocated to any one credit line may be capped at $50 million.

Having described the process of assigning risk ratings, appetites, and initial credit lines with reference to FIGS. 3 and 4, the manner in which a request 102 is processed at step 308 in FIG. 3 now will be described in detail with reference to FIG. 5. At step 502, it is determined whether the request 102 is eligible for third-tier processing. In an embodiment of the present invention, the request 102 must be for an eligible HRF or a hedge fund, as discussed with reference to FIG. 4, in order to be eligible for third-tier processing. If the request 102 is eligible at step 502, third-tier processing begins at step 504, where it is determined whether the request 102 is for an amount not exceeding an applicable allocated credit line. For example, the request may be for $1 million of credit to perform securities trading, and a corresponding credit line may already exist in an amount of $4 million, such as that shown at the credit facility 228 in FIG. 2. In this situation, the request is within the credit line, and is approved at step 506, which corresponds with step 114 in FIG. 1.

If the request 102 is not within the credit line at step 504, adjustment of the credit line may occur at steps 508, 510, and 514. The processing at steps 508, 510, 514 is referred to herein as "Reactive Line Management," and although not necessary, is advantageously performed by one or more computers. At step 508, it is determined whether the request 102 is within the allocated appetite for the product at issue. If it is determined that the request 102 is within the allocated appetite, the credit line is expanded to cover the requested amount, and a credit officer is informed of this change in the credit line at step 510. At step 512, the request 102 is approved, which corresponds with step 114 in FIG. 1. For example, assume that the request is for $5 million of credit to perform securities trading, and an allocated appetite of $5 million exists for securities trading, as shown for example at the allocated appetite 214 in FIG. 4. Also assume that the credit line for securities trading for this client is $4 million, as shown for example at the credit facility 228 in FIG. 2. In this example, it is determined that the request in within the allocated appetite at step 508, and the $4 million credit line is expanded to $5 million at step 510. Also at step 510, a credit officer is notified of the increase in the credit line. The request is approved at step 512. It should be noted that Reactive Line Management occurs without the need for human interaction, and consequently, pre-approval by an individual having an appropriate authority level specified, for example, by the allocated appetite 214 in FIG. 2, is not necessary. Such individual is only notified at step 510 and may take corrective action, if necessary. However, such adjustment of credit lines, when performed as a second-tier request 110, does require approval by the appropriate individuals.

If the request exceeds the allocated appetite at step 508, it is determined whether the request is within the total available appetite for the client and also within any concentration limits that may apply at step 514. For instance, referring to the running example using FIG. 2, any available unallocated appetite 216, and any available allocated appetites for other product lines 212, 210, 208, and 206, are checked to determine if enough available appetite exists to fulfill the request 102. Further, it is determined whether the request 102 exceeds concentration limits 232 and 234. If, at step 514, concentration limits are not violated, and available appetite exists, credit lines and appetites are adjusted, when necessary, at step 510. Further, a credit officer is notified of any changes to the credit lines and/or appetites at step 510. At step 512, the request is approved. For an example, assume that the request 102 is for $10 million for securities trading and $20 million of unallocated appetite exists, as shown for example at the unallocated appetite 216 in FIG. 2. The credit line 228 may be increased to $10 million, the allocated appetite 214 may be increased to $10 million, and the unallocated appetite 216 may be decreased to $15 million at step 510.

For another example, assume that the unallocated appetite 216 is $0. If the request 102 is for $10 million in securities trading, the allocated appetite 212 for vanilla derivatives shown in FIG. 2 may be decreased to $15 million, the allocated appetite 214 for securities trading may be increased to $10 million, and the credit line 228 for securities trading may be increased to $10 million at step 510, thereby allowing the request 102 to be approved at step 512.

For yet another example, assume that the request 102 is for $10 million credit in securities trading. Also assume that only $1 million of the unallocated appetite 216 exists, and that no other appetite is available for the allocated appetite 214. In this example, the $1 million of the unallocated appetite 216 may be shifted to the allocated appetite 214 for securities trading bringing it to $6 million, and the credit line 228 for securities trading may be extended to match the $6 million in allocated appetite at step 510. Accordingly, the request may be approved at step 512 for $6 million instead of the $10 million. Therefore, one skilled in the art will appreciate that requests may be partially approved. In this situation, a credit officer may be notified that a partial approval has occurred, thereby allowing the credit officer to manually approve the request for the full amount, if desired.

If the request 102 exceeds all available appetite or concentration limits at step 514, the request 102 is removed from third-tier processing at step 516 and a credit officer is notified for manual review. In this situation, or in the situation of a partial approval, second-tier processing is unavailable because junior personnel do not have the authority to exceed appetite or concentration limits, so the request 102 is processed as a first-tier request 112.

Figure 5:
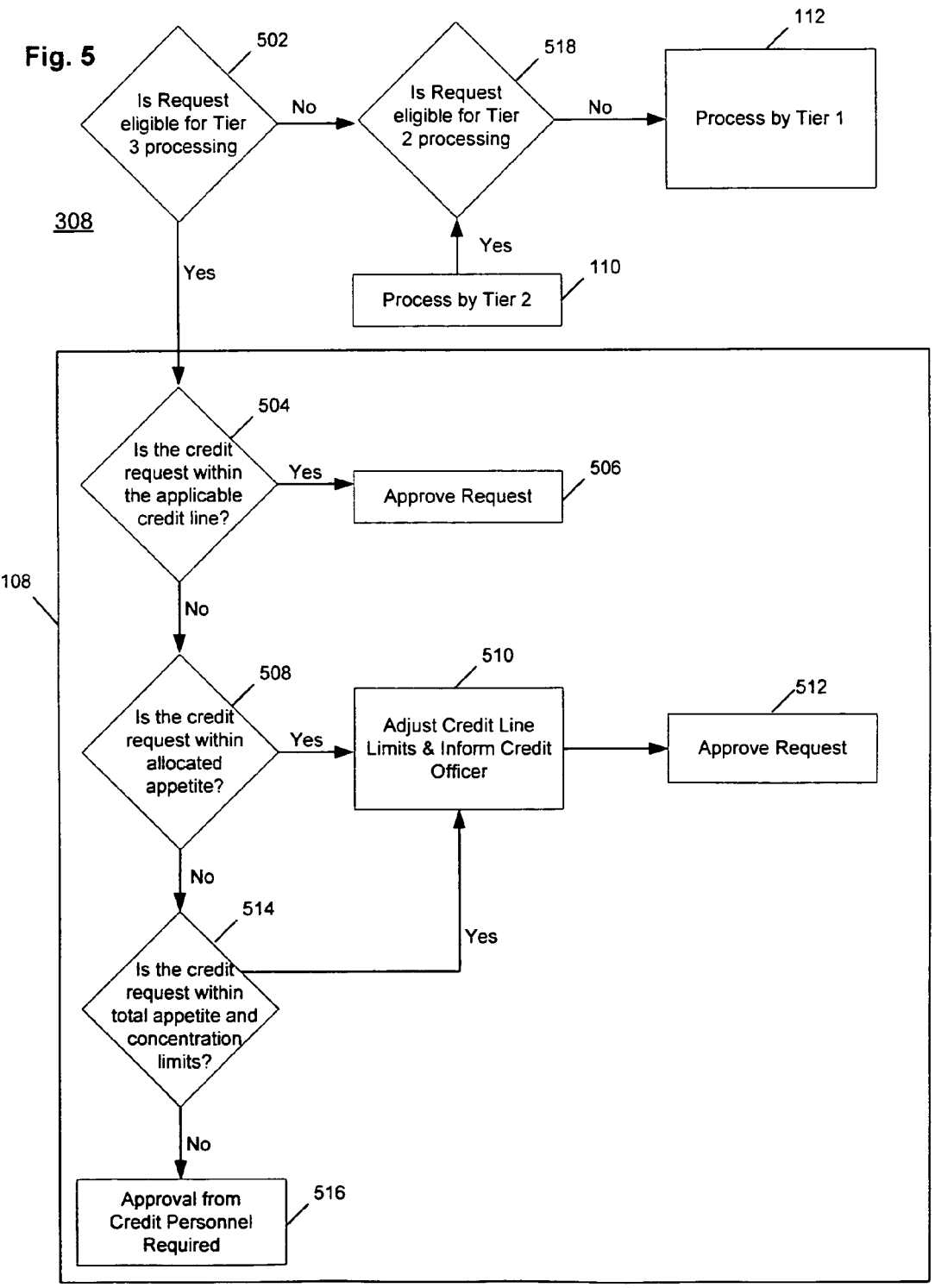
FIG. 5 illustrates a flow of a process-request procedure, according to an embodiment of the present invention.

Returning to step 502 in FIG. 5, if the request 102 is not eligible for third-tier processing, it is determined whether the request is eligible for second-tier processing at step 518. A request is determined to be eligible for second-tier processing if a credit appetite, such as that shown in FIG. 2, exists that matches characteristics of the request 102. For instance, it may be determined whether a credit appetite exists for the particular client, product, and term associated with the request 102. Using the example of FIG. 2, if the request 102 is from "Bank A" for $4 million in credit for securities trading for the next three days, the request is routed by the router 106 for second-tier processing to a junior personnel having an authority level of C1 who can approve the request according to the credit line 228. However, if no credit appetite exists that matches the request 102, it is determined at step 518 that the request 102 is ineligible for second-tier processing, and the router 106 routes the request to a credit executive for first-tier processing.

According to an embodiment of the present invention, a proactive credit line management feature is provided. In contrast to Reactive Line Management, as described at steps 508, 510, and 514 in FIG. 5, proactive line management is a process that may be performed multiple times over a period of time, such as periodically, to minimize the occurrence of credit-line limit violations that may be detected at step 504 in FIG. 5, for example. For instance, referring to the example of FIG. 2, if it turns out that "Bank A" is performing mostly securities trading and never trades derivatives, Bank A's credit requests 102 may often exceed the credit line 228 for securities trading while never exceeding the credit line 226 for trading derivatives. Accordingly, proactive line management in this situation increases the credit line 228 for securities trading and reduces the credit line 226 for derivatives trading.

Figure 6:
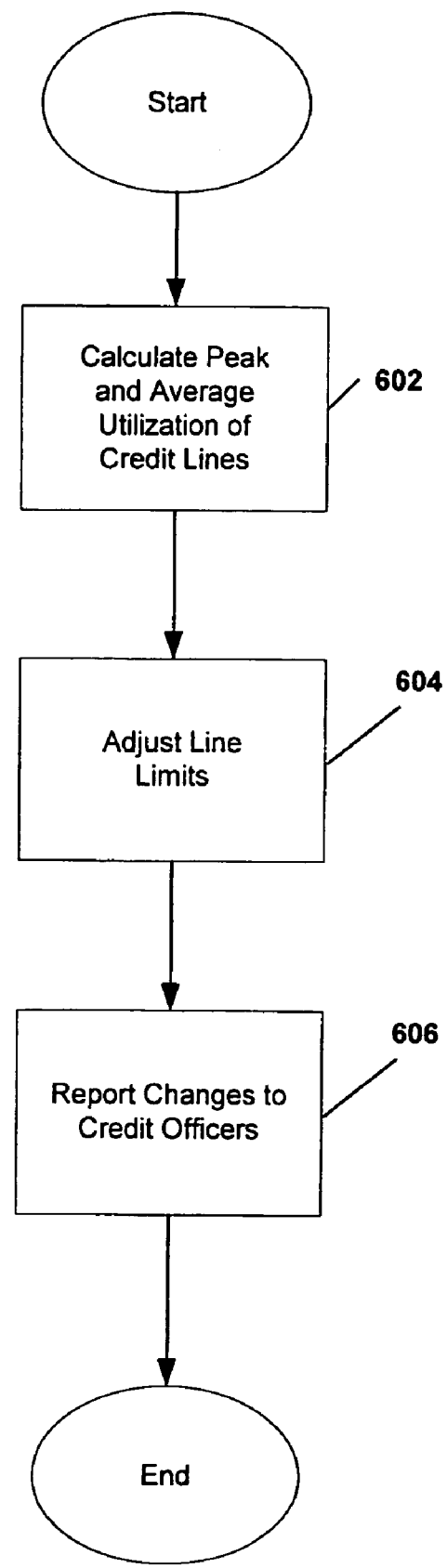
FIG. 6 illustrates a proactive credit line management procedure, according to an embodiment of the present invention.

According to an embodiment of the present invention, proactive line management is illustrated in FIG. 6. At step 602, peak and average utilization of individual credit lines for a client are calculated. With this information, each credit line amount is adjusted according to Table V.

TABLE V

| IF | THEN |
| --- | --- |
| (Peak Utilization < 80% of Line Amount) and (Average Utilization < 60% of Line Amount) | Adjusted Line Amount is assigned: (Line Amount - (50% of (Peak Utilization - Average Utilization)) |
| (Peak Utilization > 80% of Line Amount) and (Peak Utilization < 90% of Appetite) | Adjusted Line Amount is assigned: (90% of Appetite) |
| (Peak Utilization > 80% of Line Amount) and (Peak Utilization > 90% of Appetite) | Adjusted Line Amount is assigned: (95% of Appetite). AND Post Warning Message |

As shown in the first row of the example of Table V, if peak utilization and average utilization of the credit line is low as compared to the credit line itself, the credit line is reduced. The amount of the reduction may be used to increase other credit lines that are more actively used. As shown in the second row of the example of Table V, if peak utilization is close to the credit line amount, which may be defined as 80% of the credit line, the credit line is increased to include most of the appetite, which in this example is 90% of the appetite. As shown in the third row of the example of Table V, if peak utilization is close to the appetite amount, which may be 90% of the appetite, the credit line is increased to almost all of the appetite, defined in this example as 95% of appetite. Also in this case where the credit line usage is near the appetite amount, credit personnel may be notified with a warning message indicating that it may be likely that the credit line will be exceeded in the near future. It should be noted that the example of Table V is used for illustration purposes only, and one skilled in the art will appreciate that the invention is not limited to this example of how to perform proactive line management. What is important is that historical data of credit line utilization is used to increase or decrease credit lines to tailor them to the client's usage characteristics.

At step 606 in FIG. 6, any time a change in a credit line is made, a credit executive may be notified of such change.

It is to be understood that the exemplary embodiments are merely illustrative of the present invention and that many variations of the above-described embodiments can be devised by one skilled in the art without departing from the scope of the invention. For instance, although the present invention is often described as having senior credit personnel evaluate first-tier requests and junior personnel evaluating second-tier requests, one skilled in the art will appreciate that any person can be assigned to evaluate either first-tier and/or second-tier requests. Further, although the present invention provides examples where select low risk requests are processed as third-tier requests, one skilled in the art will appreciate that any request capable of being evaluated, at least in part by a computer system may be evaluated as a third-tier request, and that defining which requests are processed as third-tier requests is a matter of discretion. Additionally, although the invention is described as having three tiers, one skilled in the art will appreciate that all three tiers are not required. It is therefore intended that any and all such variations be included within the scope of the following claims and their equivalents.

What is claimed is:

1. A computer-implemented method for managing credit limits, the method comprising the steps of:
   identifying, by a computer, a plurality of credit limits associated with a client, wherein the plurality of credit limits each represent a maximum credit amount that may be extended to the client;
   calculating, by the computer, historical usage statistics for each of the plurality of credit limits, wherein the historical usage statistics comprise a frequency of use of each of the plurality of credit limits; and
   changing, by the computer, a first credit limit from within the plurality of credit limits by reallocating credit limits between at least one of the plurality of credit limits and the first credit limit based at least upon the historical usage statistics.

2. The computer-implemented method of claim 1, wherein the historical usage statistics include peak and average utilization.

3. The computer-implemented method of claim 1, further comprising the step of reporting an adjustment made to at least one of the credit limits.

4. A computer-implemented method for managing credit limits, the method comprising the steps of
   identifying, by a computer, a plurality of credit limits associated with a client, wherein the plurality of credit limits each represent a maximum credit amount that may be extended to the client;
   calculating, by the computer, historical usage statistics for each of the plurality of credit limits, wherein the historical usage statistics comprise a frequency of use of each of the plurality of credit limits;
   changing, by the computer, a first credit limit from within the plurality of credit limits by reallocating credit limits between at least one of the plurality of credit limits and the first credit limit based at least upon the historical usage statistics; and
   reporting an adjustment made to at least one of the credit limits, wherein the historical usage statistics include peak and average utilization.

5. A computer-accessible memory storing computer code for causing one or more computers to implement a method for managing credit limits, wherein the computer code comprises:
   code for identifying a plurality of credit limits associated with a client, wherein the plurality of credit limits each represent a maximum credit amount that may be extended to the client;
   code for calculating historical usage statistics for each of the plurality of credit limits, wherein the historical usage statistics comprise a frequency of use of each of the plurality of credit limits; and
   code for changing, by the computer, a first credit limit from within the plurality of credit limits by reallocating credit limits between at least one of the plurality of credit limits and the first credit limit based at least upon the historical usage statistics.

6. The computer-accessible memory of claim 5, wherein the historical usage statistics include peak and average utilization.

7. The computer-accessible memory of claim 5, wherein the computer-accessible memory further comprises code for reporting an adjustment made to at least one of the credit limits.

8. A computer-accessible memory storing computer code for causing one or more computers to implement a method for managing credit limits, wherein the computer code comprises:
   code for identifying a plurality of credit limits associated with a client, wherein the plurality of credit limits each represent a maximum credit amount that may be extended to the client;
   code for calculating historical usage statistics for each of the plurality of credit limits, wherein the historical usage statistics reflect a frequency of use of each of the plurality of credit limits;
   code for changing, by the computer, a first credit limit from within the plurality of credit limits by reallocating credit limits between at least one of the plurality of credit limits and the first credit limit based at least upon the historical usage statistics; and
   code for reporting an adjustment made to at least one of the credit limits wherein the historical usage statistics include peak and average utilization.

* * * * *